United States Patent

Chase et al.

[11] 3,802,015
[45] Apr. 9, 1974

[54] TAP

[75] Inventors: David E. Chase, Fairhaven; Eugene K. Chapman, New Bedford, both of Mass.

[73] Assignee: Research Engineering and Manufacturing, Inc., New Bedford, Mass.

[22] Filed: Jan. 10, 1972

[21] Appl. No.: 216,478

[52] U.S. Cl. .............................................. 10/152 T
[51] Int. Cl. .......................... B21h 3/08, B23q 7/00
[58] Field of Search ......... 10/141 R, 141 H, 152 T, 10/153; 85/41, 46, 48; 408/215–222, 226

[56] References Cited
UNITED STATES PATENTS
| | | | |
|---|---|---|---|
| 3,195,156 | 7/1965 | Phipard | 10/152 T |
| 3,295,154 | 1/1967 | Watson et al. | 10/152 T |
| 3,651,678 | 3/1972 | Zook et al. | 10/152 R |

FOREIGN PATENTS OR APPLICATIONS
| | | | |
|---|---|---|---|
| 635,736 | 4/1950 | Great Britain | 10/141 H |
| 110,547 | 4/1964 | Czechoslovakia | 10/152 T |

*Primary Examiner*—Charles W. Lanham
*Assistant Examiner*—E. M. Combs
*Attorney, Agent, or Firm*—Olson, Trexler, Wolters, Bushnell & Fosse, Ltd.

[57] ABSTRACT

A tap comprises a threaded tapping section and a drive tool-engaging shank portion, each having a cross section of arcuate lobular configuration. The drive shank portion may be unthreaded or may be an extension of the tapping section. Preferably, the cross section comprises three arcuate sides and three arcuate intermediate lobes, the lobes at least in the tapping section providing a series of thread-swaging surfaces. The tap is formed by roll-threading a blank with the aforesaid arcuate lobular cross section, whereby the lobes and arcuate sides on the tapping section are respectively aligned precisely coaxially with the arcuate sides and lobes on the shank portion.

6 Claims, 8 Drawing Figures

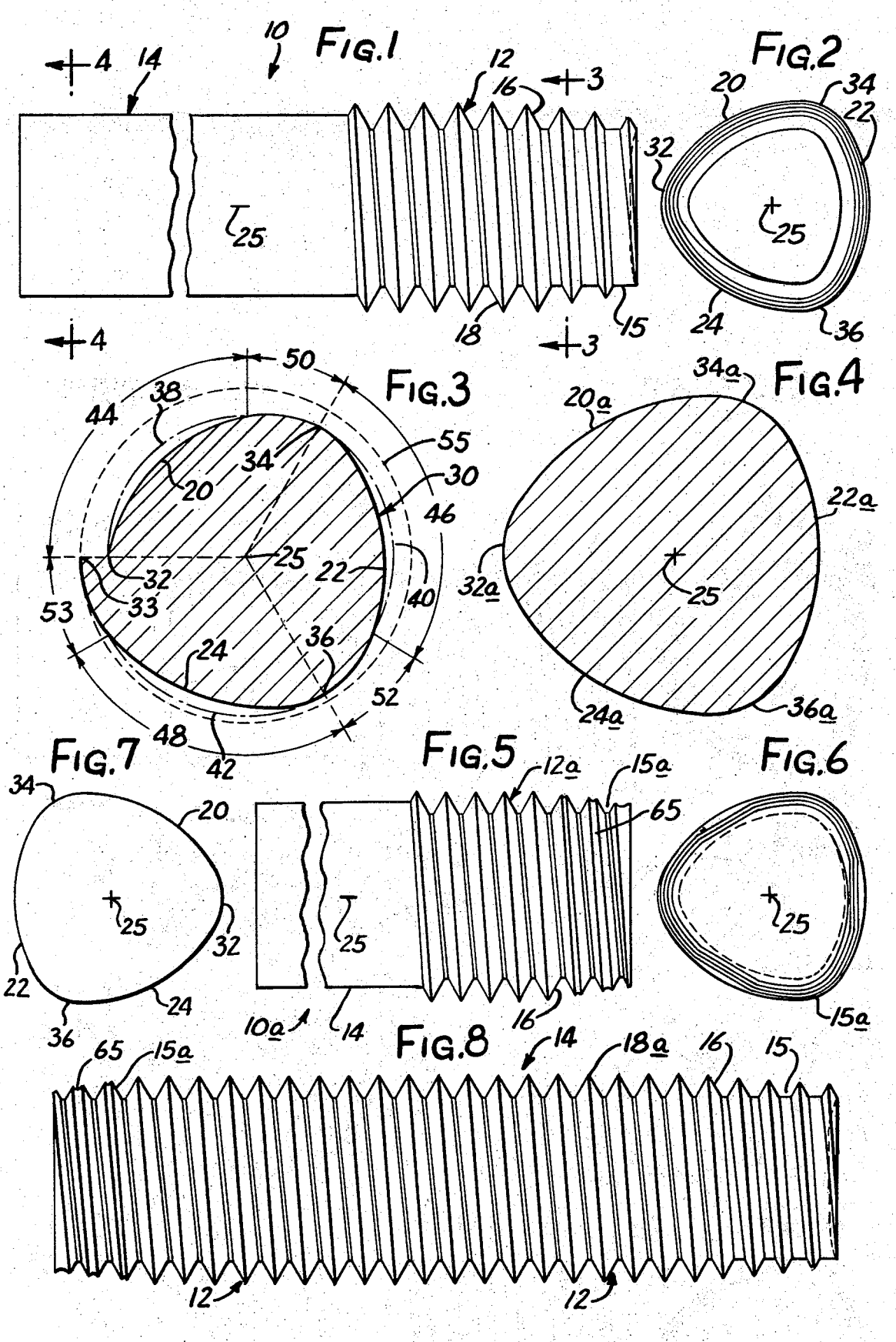

TAP

BACKGROUND OF THE INVENTION

This invention relates to improvements in taps.

In the manufacture of taps, the common practice is to form the thread on the tap body after which the drive shank, usually of square cross section, is ground or otherwise machined as a secondary operation. Since the shank and the thread are separately machined, it is exceedingly difficult to assure close concentricity between the thread and the drive shank. Moreover, because the drive shank is remote from the work-entering end of the tap, any error in alignment of the flats on the drive shank with the thread is magnified to the extent of the distance of the shank from the entering end of the tap. For this reason, precision threading of a workpiece often requires the use of a special guide bushing.

Another problem with respect to taps of the foregoing type lies in the fact that the tap body can only be satisfactorily gripped to the extent of the length of drive shank. Therefore, in certain difficult tapping operations, the fact that the tap cannot be gripped close to the work-entering end causes a loss of torsional rigidity, which might in those tapping operations be desired to assure an accurately tapped hole.

It should also be recognized that most taps are, of necessity, held during use in special collets which grip the tap shank in a sleeve and drive through a relatively loose-fitting and somewhat inaccurately centered square socket. Furthermore, in certain very precise tapping operations the tap is guided in a bushing or sleeve much like a drill bushing in a jig.

OBJECTS AND SUMMARY OF THE INVENTION

It is an object of this invention to provide a tap which is effective in swaging or otherwise forming a thread with a low driving torque applied to the tap, and in which the drive shank is accurately centered with the thread-forming portion of the tap.

It is a further object of this invention to provide a tap of the type stated which readily adapts itself to a widely used standard three-jaw chuck or collet type holder without impairing the tapping accuracy of the tap.

It is an additional object of the present invention to provide a tap of the type stated which can be gripped at any region along the tap body as may be required for the depth of hole being tapped or to provide improved torsional rigidity when required for certain difficult tapping operations.

A further object of this invention is to provide a tap of the type stated which eliminates the need for an independent bushing or guide sleeve during many types of tapping operations.

In accordance with the foregoing objects, the tap comprises a tapping section and a drive-tool engaging section or shank, such sections having a common longitudinal axis. The tapping section has a work-entering end portion and an adjacent working portion, the working portion being axially intermediate the end portion and the drive-tool engaging section. The tapping section also has a continuous roll-type thread in the end portion and in the working portion. The thread on the end portion and working portion has a cross section of arcuate, polygonal, lobular configuration with an odd number of arcuate sides and intermediate circumferentially spaced arcuate lobes. The lobes in the work-entering end portion define a series of progressive thread-swaging surfaces of increasing radius from a common axis. The drive tool-engaging shank also has a cross section of arcuate polygonal, lobular configuration which is geometrically similar to the cross section in the tapping section and with the corresponding lobes and arcuate sides of the drive-tool engaging shank being respectively parallel and coaxial with the lobes and arcuate sides of the tapping section. Thus, the arcuate sides of the shank may be gripped by a three-jaw chuck or the like for precise tapping since eccentricity between the shank and tapping thread is virtually eliminated. The tap, prior to the formation of the thread thereon, is a blank which in cross section is of the aforesaid arcuate polygonal, lobular configuration. After the thread is rolled onto the blank, no secondary machining operation for the drive tool shank is required.

In one form of the invention the arcuate, polygonal, lobular cross section in the drive-tool engaging shank section is formed by the crest of the thread extended from the working section. In another form of the invention the drive-tool engaging section is an unthreaded portion of the blank that is adjacent to the working section of the tap.

A further object of the present invention is to provide a tap with a continuous thread along its length for double end usage. Thus, the tap may have work-entering end portions at both ends but with different configurations. Typically, the end portion at one or both ends may have a thread crest with the sharpness thereof being of a different degree of development than the thread crest at the opposite work-entering end. Nevertheless, the thread may be continuous from one end of the tap to the other.

Because the arcuate crest portions of the thread of the tap are precisely coaxial with the arcuate sides of the drive-tool engaging sections, the drive tool chuck may grip the tap at the arcuate sides anywhere along the length of the tap body and still provide accurate threading of the workpiece.

BRIEF DESCRIPTION OF THE FIGURES

FIG. 1 is a side elevational view of a tap constructed in accordance with and embodying the present invention;

FIG. 2 is an end elevational view of FIG. 1;

FIG. 3 is a sectional view taken along line 3—3 of FIG. 1 but being essentially a diagramatic illustration of one convolution of a thread in the tapered work-entering end portion;

FIG. 4 is a sectional view taken along line 4—4 of FIG. 1;

FIG. 5 is a side elevational view of a modified form of tap in accordance with the present invention;

FIG. 6 is a front elevational view of the tap of FIG. 5;

FIG. 7 is a rear elevational view of the tap of FIG. 5; and

FIG. 8 is a side elevational view of a further modification of the invention.

DETAILED DESCRIPTION

Referring now in more detail to the drawing, which illustrates preferred embodiments of the present invention, FIG. 1 shows a tap 10 having a tapping section 12 and a drive-tool engaging shank 14. The tapping section 12 includes a tapered work-entering end portion 15 which merges with a working portion 16. The portions 15 and 16 are provided with a helical roll-type thread 18.

It will be seen that the threaded or tapping section 12 has a cross section of arcuate, polygonal, lobular configuration. This configuration preferably comprises three relatively broad arcuate sides 20, 22, 24 and intervening arcuate lobes 32, 34, 36. The configuration and thread on the tapping section 12 may be the same as that disclosed in Phipard, Jr. U.S. Pat. No. 3,195,156, the disclosure of which may by reference be incorporated herein. Accordingly, an exhaustive analysis of the shape of the threaded or tapping section 12 need not be presented herein.

Suffice it to say for brevity, that the lobes 32, 34, 36 in the work-entering end portion 15 define a series of progressive thread swaging surfaces of increasing radius from the longitudinal axis 25 of the tap 10. Further, with reference to FIG. 3, the line 30 represents the crest contour of one helical revolution on the tapered work-entering end. The root of the thread that will be tapped in a workpiece will be formed by the crests of the lobes 32, 34, 36. Such root may be represented by the circular arcs 38, 40, 42, the extent of which may be further represented by the circular arcs 44, 46, 48. Since the arcuate sides 20, 22, 24 each have a long radius of curvature relative to the radius of curvature of the lobes, the arcuate sides in effect recede from the crests and constitute relief areas which do not frictionally engage the workpiece over the arcs 44, 46, 48. Therefore, the working or swaging engagement of the lobes 33, 36, 34 with the workpiece is over the arcs 50, 52, 53. The line 55 represents the root diameter of the thread that is formed in the workpiece.

While the thread in the tap 10 may, as previously described, be similar to the thread of the tapping screw in the aforesaid U.S. Pat. No. 3,195,156, the out-of-round condition of the tap may be somewhat greater than that of a tapping screw shown in that patent. Thus, the crests 32, 33, 34, 36 may be sharper and the arcuate sides 20, 22, 24 may be somewhat flatter. The reason for this lies in the fact that the tap, in contrast to a tapping screw, need not have any holding power since the tap is withdrawn from the workpiece after threading the hole therein.

As seen in FIG. 4, the shank 14 is also of a trilobular cross section that is geometrically similar to the cross sectional configuration of the tapping section 12. Consequently, the shank 14 has arcuate sides 20a, 22a, 24a and intermediate lobes 32a, 34a, 36a which are respectively parallel and coaxial with the lobes and arcuate sides in the tapping section 12.

The tap may be roll-threaded in conventional thread-rolling dies in accordance with the techniques disclosed in the aforesaid U.S. Pat. No. 3,195,156. The blanks used will be of a configuration that is identical to that of the shank 14 so that the thread 18 for the tapping section 12 will simply be a thread rolled onto a portion of the blank. If desired, however, the thread may be rolled throughout the full length of the blank. In the roll-threading operation the displacement of the metal in forming the work-entering threads results in trapping excess metal in the transition region leading from the work-entering portion 15 to the working portion 16. This confinement of excess metal in the aforesaid transition region causes the first thread of the working portion 16 to be oversize. This is particularly desirable for the tap and is a feature that is ordinarily introduced into a tap only by the use of involved machining to achieve this so called "back taper" condition.

FIGS. 5-7 show a modified form of a tap 10a having a shank 14 that is similar in configuration to that of the shank in the tap of FIGS. 1-4. The tapping section 12a is also similar except that in the tapered lead section 15a the crest 65 of the thread is not fully developed, whereas a fully developed crest is provided in the tap of FIGS. 1-4. This type of lead section may be desired for certain tapping operations.

FIG. 8 shows a further modified form of the invention in which the tap has the thread extending throughout the length thereof. Like the taps of FIGS. 1-4 and FIGS. 5-7 the tap of FIG. 8 is of tri-lobular, cross section. However, the thread 18a extends throughout the full length of the tap. The tri-lobular blank is rolled to form a tapered lead section 15 on one end which is like the tapered lead section of FIGS. 1-4. On the other end of the tap the tapered lead section 15a is like that shown in FIGS. 5-7. Thus, the tap of FIG. 8 is capable of double end usage. Of course, both work-entering ends could have the same configuration, if desired.

In use, a three jaw chuck may be used to grip the shank 14 such that the jaws of the chuck engage the arcuate sides 20, 22, 24. Since the sides 20, 22, 24 are accurately centered with respect to the thread on the tapping section, the tap rotates about the axis 25 without eccentric movement. Moreover, since the crest of the thread 18 is also tri-lobular in section, the tap may be inserted into the jaws such that they grip on the crest of the thread in the working portion 12. In fact, this will occur whenever a tap of the type shown in FIG. 8 is used. This permits the tap to be gripped close to the work-entering end thereof to enhance torsional rigidity of the tap in difficult tapping operations where high accuracy is required.

We claim:

1. A tap comprising a shank having a tapping section and a drive tool-engaging section, said sections having a common longitudinal axis, said tapping section having a work-entering end portion and an adjacent working portion, said working portion being axially intermediate said end portion and said drive-tool engaging section, said tapping section also having a continuous roll-type thread in said end portion and in said working portion, the thread on said end portion and said working portion having a cross section of arcuate, polygonal lobular configuration with an odd number of arcuate sides and intermediate circumferentially spaced arcuate lobes, the lobes in the work-entering end portion defining a series of progressive thread-swaging surfaces of increasing radius from said axis, the drive tool-engaging section also having a cross section of arcuate polygonal lobular configuration and which in geometrically similar to said cross section in said working portion and with the corresponding lobes and arcuate sides of the two last-mentioned cross sections being respectively parallel and coaxial, whereby the arcuate sides of the tool-engaging section may be gripped by a drive tool chuck or the like so that the axis of rotation of said chuck coincides with said common axis to provide concentric gripping of the tool over a substantial length of the tap; the tap, prior to the formation of the thread thereon, being a blank which in cross section is of arcuate polygonal lobular configuration that is geometrically similar to said cross section in said drive tool-engaging section.

2. A tap according to claim 1 in which the arcuate polygonal lobular cross section in the drive-tool engaging section is formed by the crest of the thread of said working section that extends into said tool-engaging section.

3. A tap according to claim 1 in which said arcuate polygonal cross section in the tool-engaging section is an unthreaded extension of said working section.

4. A tap according to claim 1 including an additional work-entering end portion at the end of the tap that is opposite to said first-mentioned work-entering end, said additional work-entering end portion also having a thread that is geometrically similar to the thread in the first-mentioned end portion but with the sharpness of the crests being of a different degree of development.

5. A tap according to claim 1 in which the number of arcuate sides is three.

6. A tap according to claim 1 including an additional work-entering end portion at the end of the tap that is opposite to said first-mentioned work-entering end portion, said additional work-entering end portion also having a thread that is geometrically similar to the thread in the first-mentioned end portion and with the sharpness of the crests being of substantially the same degree of development as in said first-mentioned end portion.

* * * * *